United States Patent Office 3,502,278
Patented Mar. 24, 1970

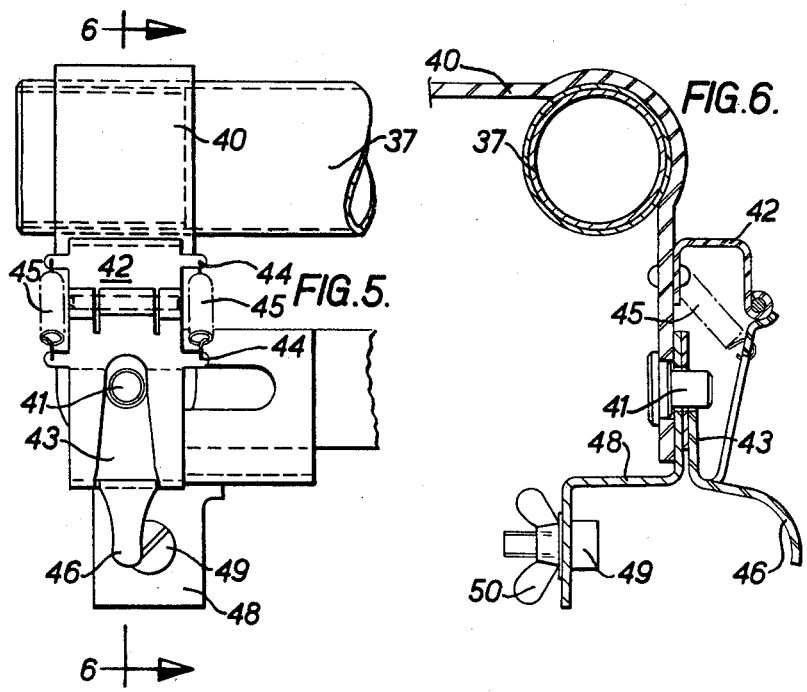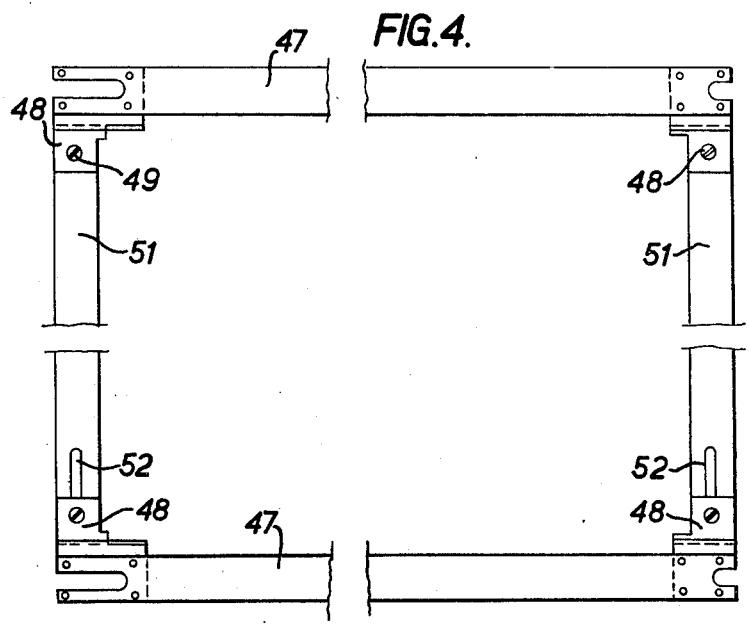

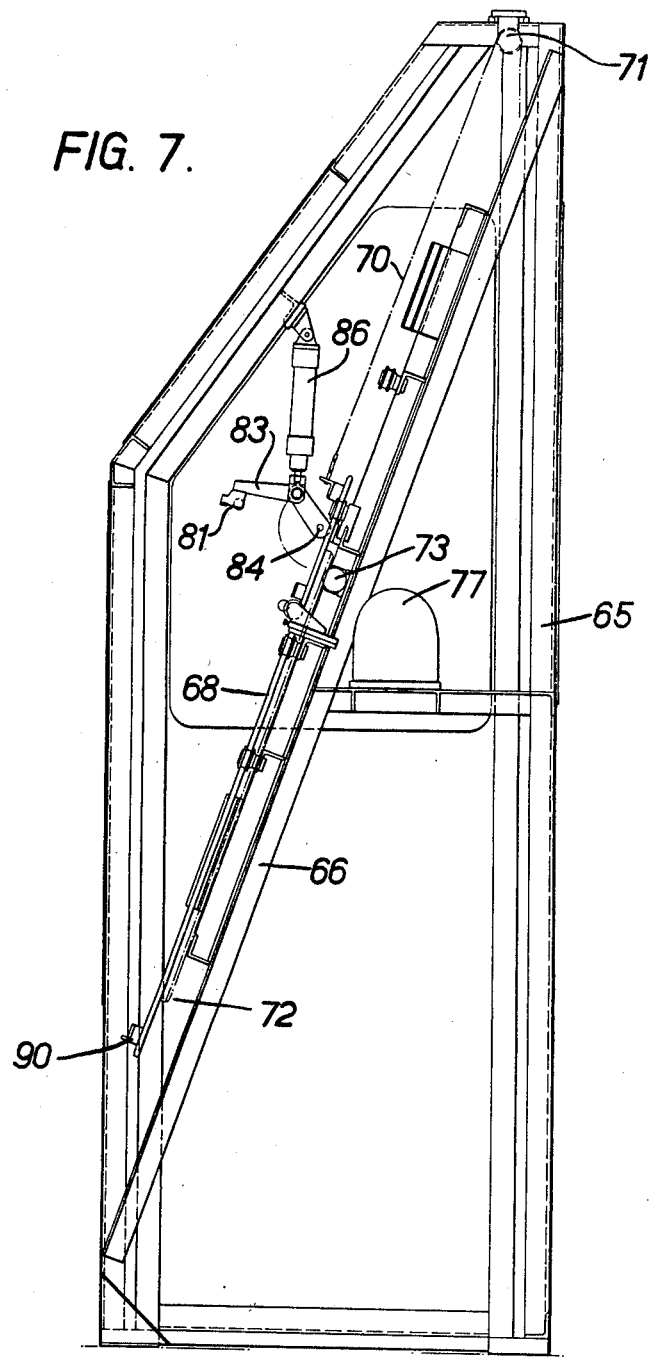

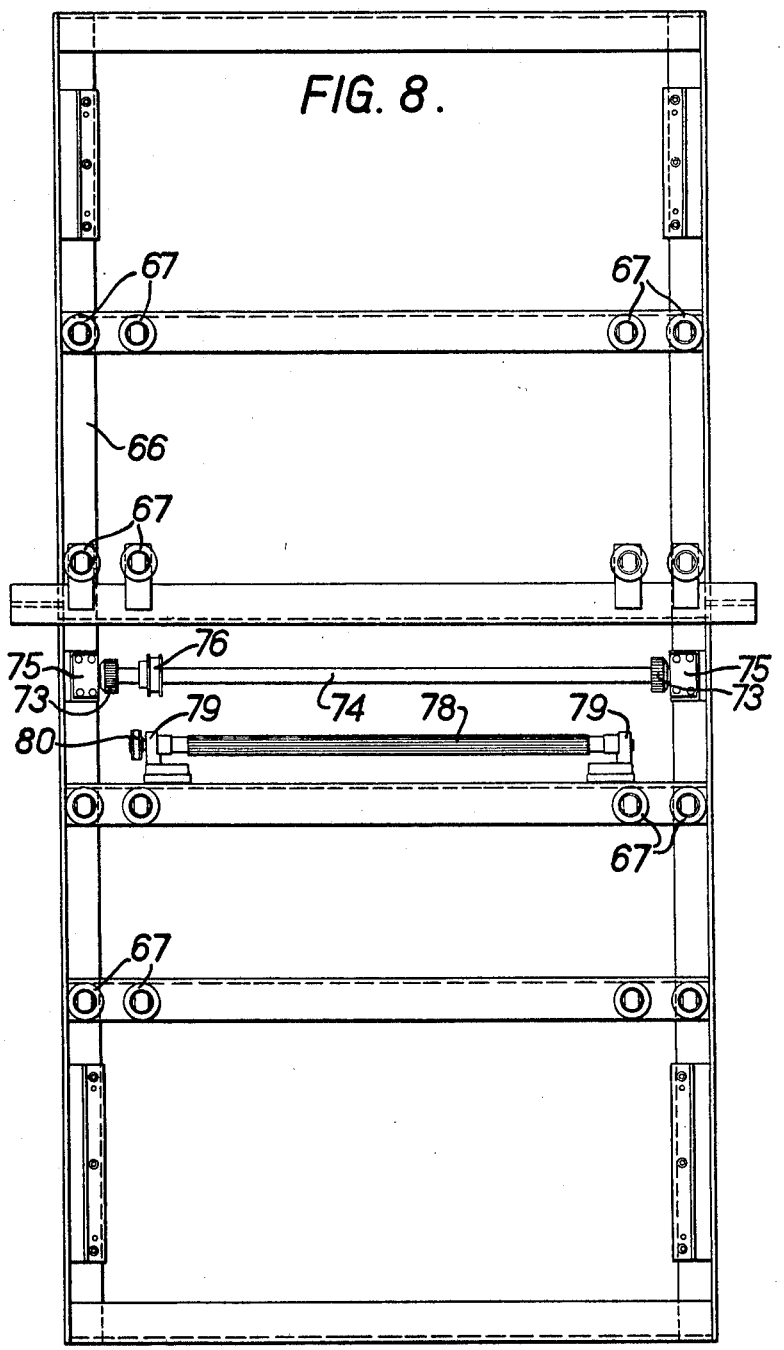

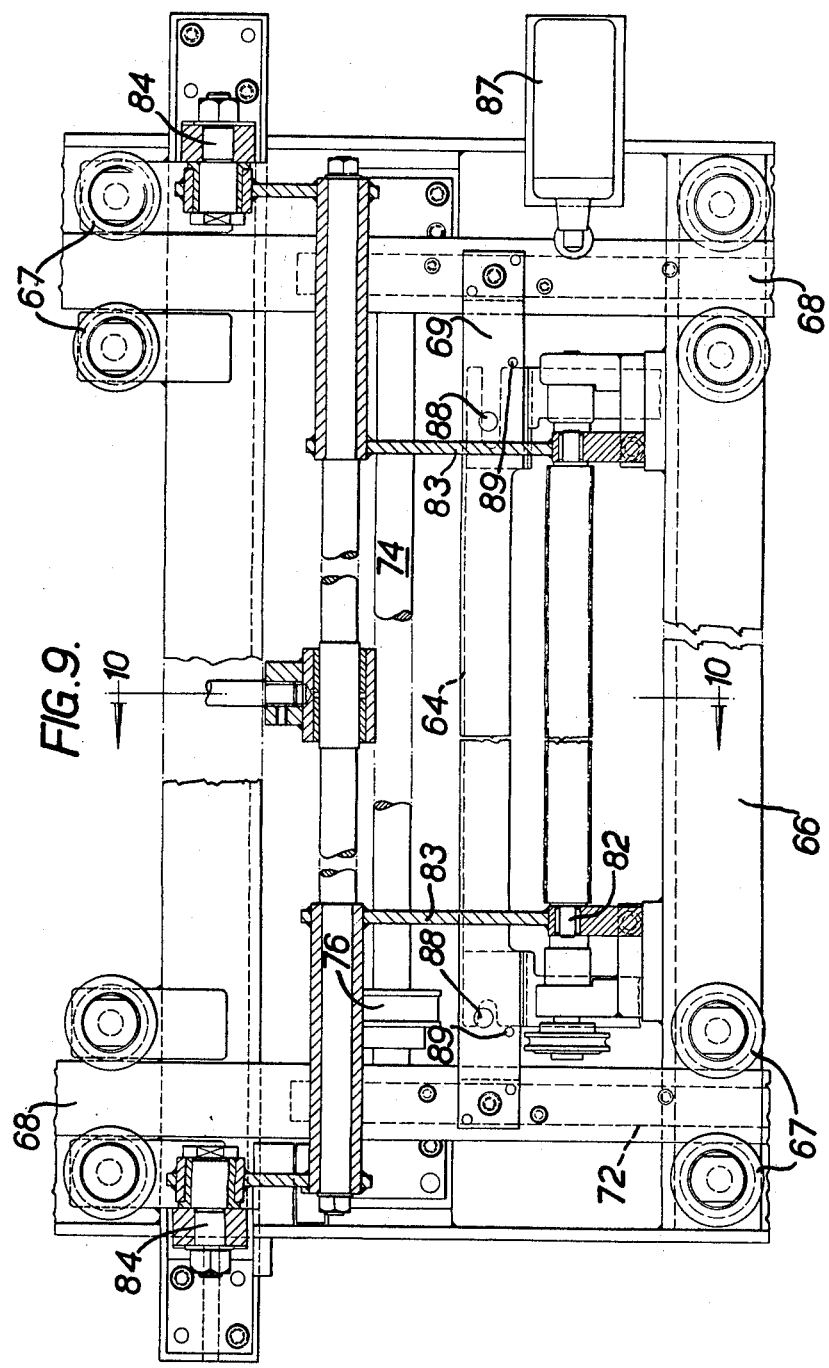

3,502,278
ARRAYS OF HEATING WIRES FOR INCORPORATION IN LAMINATED TRANSPARENT PANELS
John Ernest Powell, Birmingham, and Malcolm Walter Lacey, Tipton, England, assignors to Triplex Safety Glass Company Limited, London, England, a British company
Filed May 5, 1965, Ser. No. 453,433
Claims priority, application Great Britain, May 5, 1964, 18,599/64; Jan. 28, 1965, 3,728/65
U.S. Cl. 242—7.13        11 Claims

ABSTRACT OF THE DISCLOSURE

Apparatus for forming arrays of heating wires for incorporation in a laminated transparent panel comprising a frame rotatably mounted on a stand, a wire feed device being movable parallel with the axis of rotation of the frame, the frame including means uniformly and simultaneously adjusting the size thereof.

---

Figure 1:
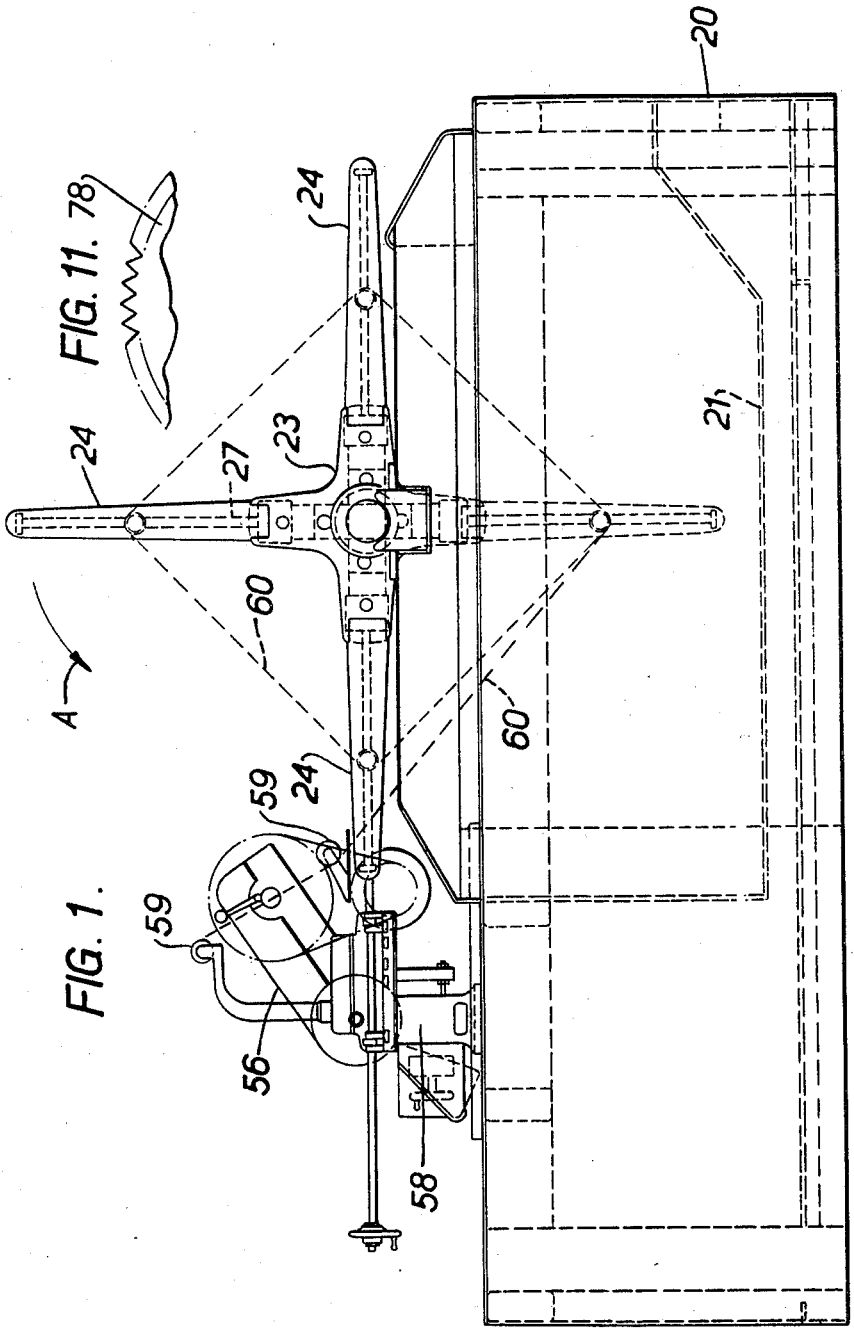

This invention relates to transparent panels incorporating arrays of heating wires such that in use, when the wires are connected to a suitable source of electricity, the current passing through the wires heats the wires and the panel. Panels of this kind are referred to in this specification as wired panels. Wired panels may be used for many purposes, and may, for example, be used as the windscreens and backlights of motor vehicles.

The wires incorporated in wired panels are relatively thin, and this invention is only concerned with arrays of heating wires of which the individual wires are less than 0.003 inch in diameter. The wires may be made of a nickel and chromium alloy or of cupro-nickel, but the wires are preferably made of tungsten. Tungsten wire is particularly suitable as it is less reflective than the other types of wire mentioned, it has a higher specific conductivity so that the heating effect obtained with tungsten wire is equivalent to that obtained with another wire of greater thickness, and it is available commercially in a thickness as small as 0.0005 inch. The handling of such thin wire is difficult, and it will be appreciated that the formation of an array of long, straight wires in closely spaced parallel relationship, for incorporation in a wired panel, gives rise to numerous difficulties. In one method employed hitherto for forming such an array, wire has been unwound by hand from a spool and arranged on a frame comprising two parallel rows of pegs, the wire being passed round a peg in one row, passed across to the other row and round a peg in this row before being passed back again to the first row where it is passed round the peg adjacent to the first peg. The process is continued, the wire passing round successive pegs in each row, and an array of parallel wires is built up between the rows. This method is slow and can only be carried out by a skilled person. In another method which has also been employed hitherto a plurality of wires has been drawn simultaneously from a plurality of spools through a comb-like guide so as to form a band of closely spaced parallel wires. Successive bands are disposed side-by-side to form an array. This method suffers from the disadvantage that in practice it is found that wires of the same nominal diameter but from different spools vary somewhat in actual diameter. Although these variations are within normal manufacturing tolerances they have an adverse effect on the wired panel in which the wires are incorporated, for in use the ratio of the heat generated in one wire to that generated in another is proportional to the ratio of the square of the diameter of the one wire to the square of the diameter of the other.

The object of the present invention is to overcome or reduce these difficulties.

According to the present invention there is provided a method of making a laminated transparent panel of the kind which incorporates an array of heating wires, in which method the array of heating wires is formed by winding wire onto a frame, there being relative rotary movement between the frame and the wire feed and relative translatory movement between the frame and the wire feed in a direction parallel to the axis of rotation, so that a plurality of spaced turns of wire is formed on the frame; the wire is secured to each of a pair of supports, each support extending in a direction transverse to the turns of wire; each turn of wire is severed so that an unsevered length of each turn extends between the supports; and incorporating the resulting array of wires in the panel.

The term "frame" is used in a general sense and includes any suitable structure on which the wire can be wound.

The frame is preferably so shaped as to present two or more spaced, parallel corner members around which each turn of wire passes, each corner member being so shaped that the wire forms a smooth curve where extending around it. There may be two corner members or more, a particularly convenient form of frame having four corner members so arranged that each turn of wire is substantially square. Preferably an array of wires is formed from those parts of the turns extending between each successive pair of corner members, the number of arrays thus being equal to the number of corner members. In this case a support is preferably introduced on each side of each corner member, immediately adjacent to the member. The supports may be present before the wire is wound onto the frame or may be introduced subsequnetly.

Figure 2:
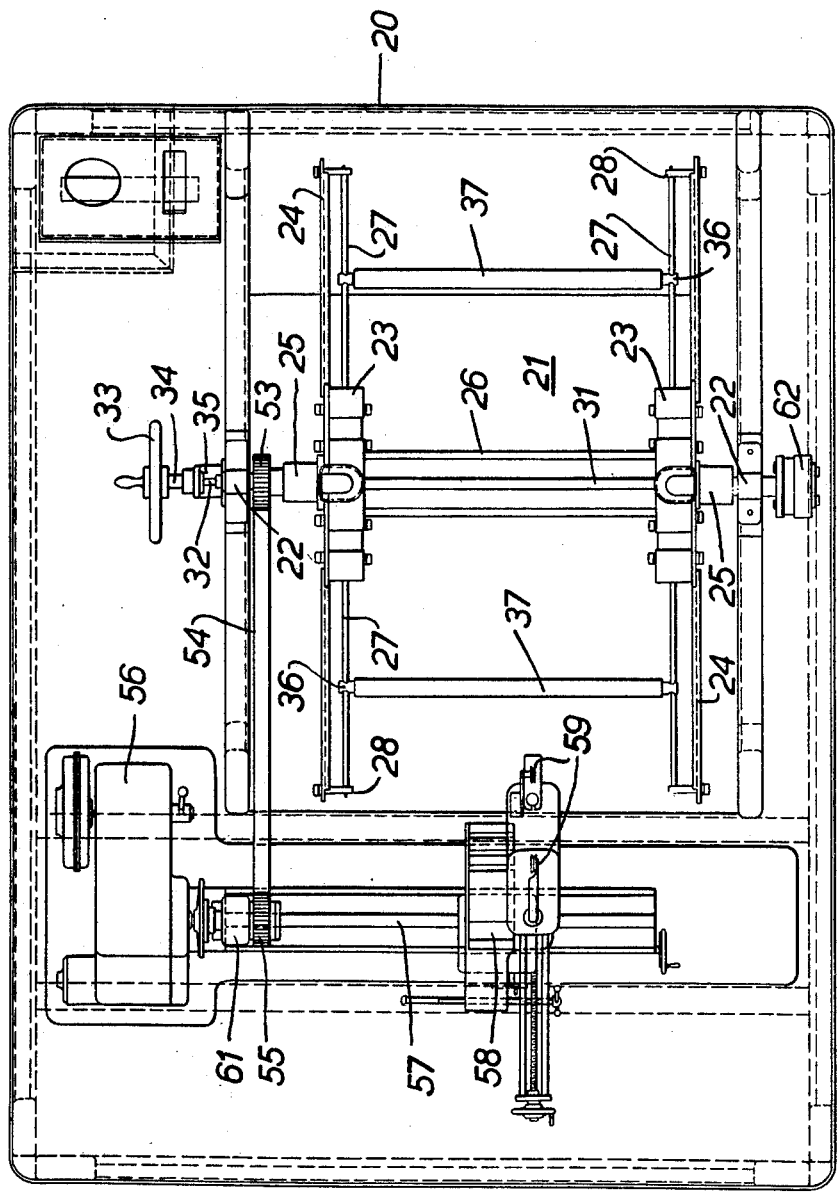
Figure 3:
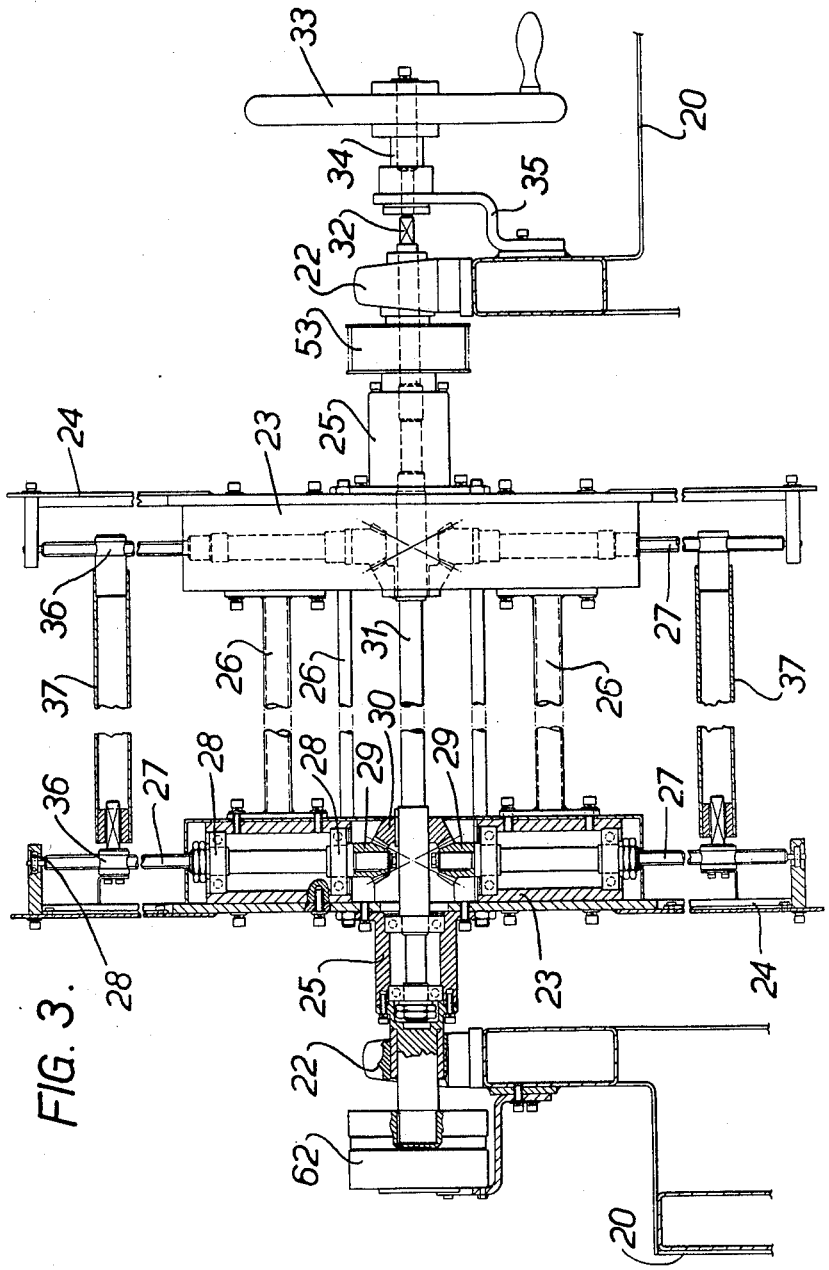
Figure 10:
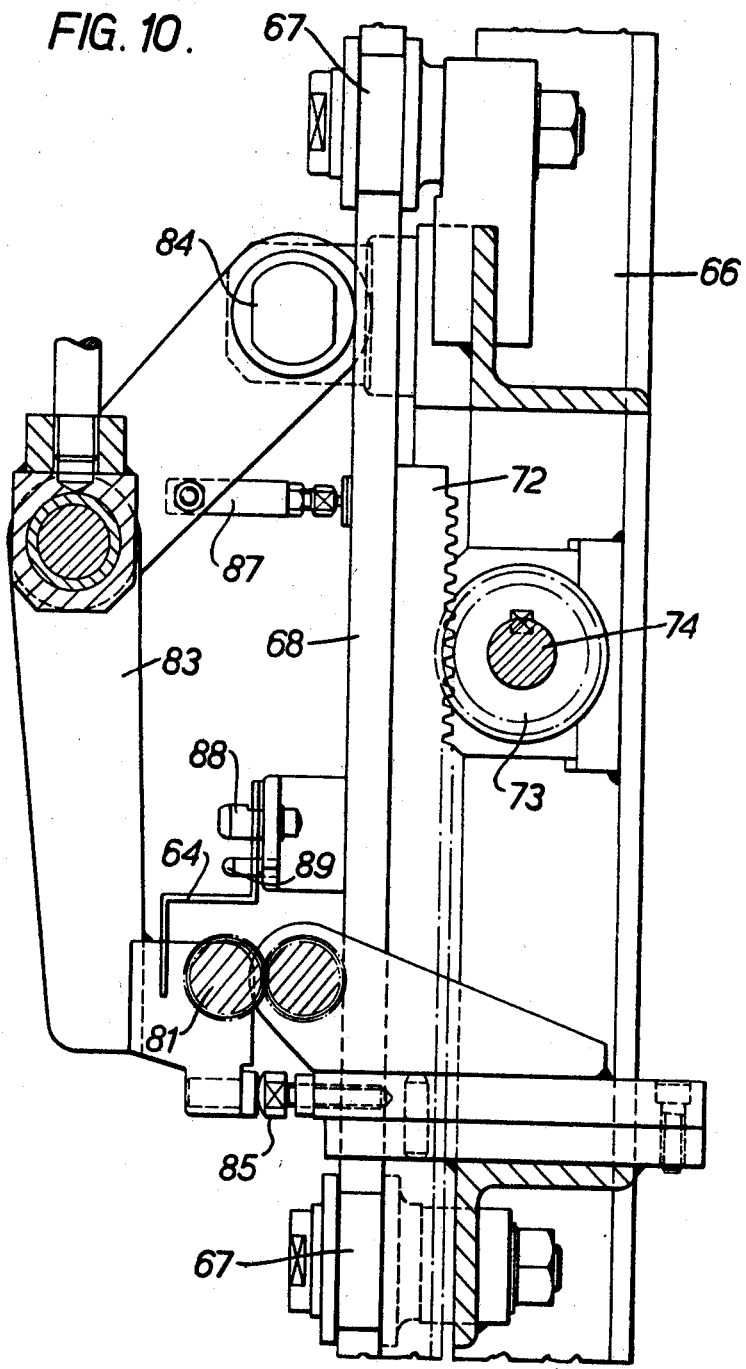
Figure 14:
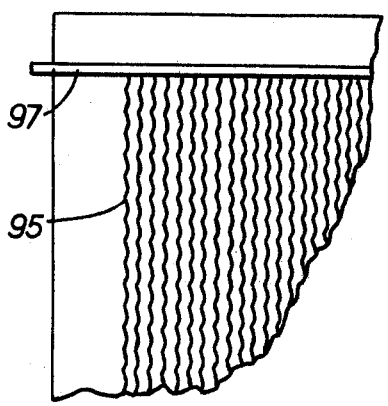
Figure 15:
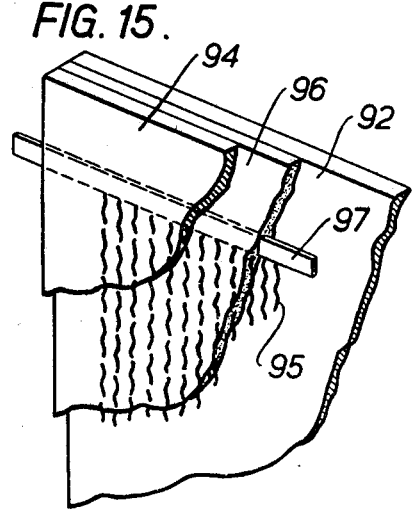
Figure 13:
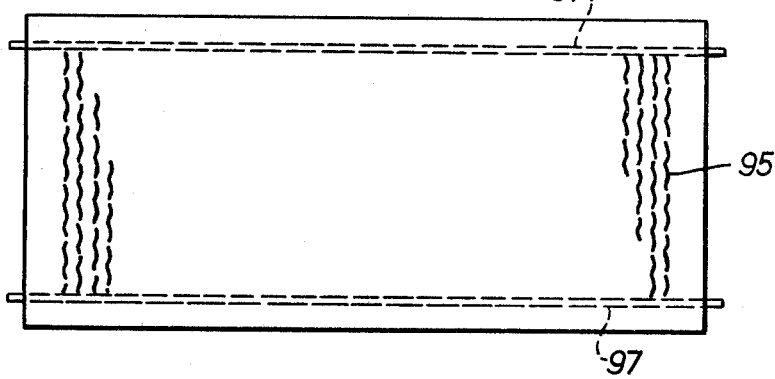
Figure 12:
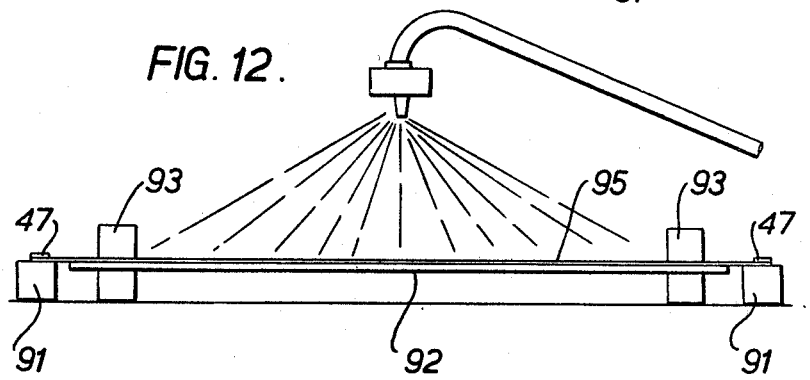

The invention will be more particularly described with reference to the accompanying drawings, in which:

FIGURE 1 is an end elevation of a winding machine for use in making arrays of wires, FIGURE 2 is a plan view of the machine shown in FIGURE 1, FIGURE 3 is a side view, to a larger scale, and partly in section, of part of the winding machine shown in FIGURES 1 and 2, FIGURE 4 shows a sub-frame for use on the winding machine shown in FIGURES 1 to 3, FIGURE 5 is a front view, to a larger scale, of a clamp on the winding machine and a corner of a sub-frame held by it, FIGURE 6 is a section substantially along the line 6—6 of FIGURE 5, FIGURE 7 is a side view of a crimping machine for use in crimping the wires in an array, one side having been removed to reveal the interior, FIGURE 8 is a front view of the guide for the carrier which forms part of the crimping machine shown in FIGURE 7, FIGURE 9 is a view, to a larger scale, of the central part of the guide shown in FIGURE 8, and associated parts, some of which are shown in section, FIGURE 10 is a section, to a larger scale, along the line 10—10 of FIGURE 9, FIGURE 11 shows a portion of one of the ribbed crimping rollers, to a considerably larger scale, this figure merely serving to illustrate the shape of the ribs, FIGURE 12 is a diagrammatic view illustrating a later process in the manufacture of a wired panel, FIGURE 13 shows a completed wired panel, FIGURE 14 shows a corner of the panel shown in FIGURE 13 but to a larger scale, and FIGURE 15 shows this corner in perspective with parts broken away to reveal the construction.

The machine shown in FIGURES 1 to 3 comprises a stand 20 formed with a recess 21, and having a pair of upstanding aligned bearings 22, one at either end of the recess. A frame is mounted between the bearings for rotation about a horizontal axis. The frame includes a pair of spaced, parallel spiders 23 each spider having four arms 24 projecting radially outwards from one end of a short spindle 25, the arms being at 90° intervals around the axis of the spindle. The spindles 25 of the spiders 23 are coaxial and directed away from each other, the spindles being rotatably mounted in bearings 22. Each arm 24 of one spider 23 is connected to a corresponding arm of the other spider by a bar or bars 26 parallel with the axis of the spindles 25 and spaced a little way from it. A screw-threaded rod 27 extends along one side of each arm and is supported by bearings 28, near each end, for rotation about its own axis, which axis is normal to the axis of the spindles 25. Each rod 27 carries a bevel gear 29 at its inner end which meshes with a bevel gear 30 mounted on a shaft 31 co-axial with the spindles 25 and extending between them. The ends of the shaft 31 are rotatably mounted in the spindles 25, which are hollow, and one end carries an extension 32 which projects from the outer end of the spindle 25 and can be releasably connected to a hand-wheel 33 which is mounted on a spindle 34 rotatable in a bracket 35 and can be moved axially towards and away from the frame so that the extension 32, which is of square cross-section, can engage or disengage a correspondingly shaped recess in the spindle 34.

It will be seen that there are two bevel gears 30 on the shaft 31, one meshing with the four bevel gears 29 on the rods 27 of one spider 23, and the other meshing with the four bevel gears 29 on the rods 27 of the other spider 23. Each screw-threaded rod 27 carries a non-rotating nut 36 which is connected to one end of a corner bar 37. There are four corner bars 37, each in the form of a non-rotatable metal tube with a smooth outer surface, each corner bar being parallel with the axis of the spindles 25 and of the shaft 31 and extending between the nut 36 on the rod 27 of one arm 24 on one spider 23, and the nut 36 on the rod 27 of the corresponding arm 27 on the other spider 23. The four corner bars 37 are equidistant from the axis of the spindles 25, but the distance can be varied by rotating the shaft 31 relatively to the spindles 25 and spiders 23 with the aid of the handwheel 33.

A clamp is fixed to each end of each of the corner bars 37. The clamps are not shown in FIGURES 1 to 3, but one is shown in detail in FIGURES 5 and 6. A two-armed bracket 40 is secured to the corner bar 37, the arms of the bracket projecting at right angles to each other, and each pointing towards an adjacent corner bar. Each arm carries an outwardly directed locating pin 41 adjacent to its outer end, and also carries a subsidiary bracket 42 which is mounted on the outer face of the arm between the pin 41 and the corner bar 37. The subsidiary bracket 42 has a clamping member 43 pivotally connected to it. The clamping member 43 and the subsidiary bracket 42 are both formed with pierced lugs 44 to which helical tension springs 45 are connected, the arrangement being such that the clamping member 43 can move over-dead-centre between the position illustrated, in which a portion 46 with a forked end engages the pin 41, and a position in which the portion 46 is spaced away from the pin 41 and away from the arm of the bracket 40 on which the pin is mounted. The clamping member 43 includes an integral handle 46 enabling the clamping member to be readily moved from one position to the other.

Supports 47, in the form of flat metal bars with slotted ends, can be mounted on the winding frame by means of the clamps. Two such supports are shown in FIGURE 4, and the end of one support is also shown in FIGURES 5 and 6. In use the supports are mounted on the locating pins 41 and releasably held in place by the spring-urged clamping members 43. Each support conveniently forms part of a subframe, and is provided with a cranked bracket 48 at each end. Each bracket is provided with a bolt 49 and wing-ribe 50 whereby it can be attached to one end of one side member 51 of the sub-frame, as shown in FIGURE 4, the ends of the side members 51 being slotted. When the positions of the corner bars 37 are adjusted, as described above, the distance between the pair of supports in each sub-frame alters. In order to accommodate these alterations each side members 51 is provided at one end with a relatively extensive slot 52. Sets of side members of different lengths would usually be provided to extend further the range of possible adjustment.

A pulley 53 is fixed to that spindle 25 adjacent to the hand-wheel 33, and carries a driving band 54 which also passes over a pulley 55 driven by an electric motor through change-speed gearing indicated generally at 56. The mechanism is not described in detail as it is similar to that of a lathe, the pulley 55 being in the equivalent position to the chuck of a lathe. A screw-threaded shaft 57 below the pulley 55 is also driven through change-speed gearing by the same motor, and corresponds to the feed screw of the lathe. A carriage 58 mounted on the equivalent of the saddle of the lathe can thus be moved in a direction parallel with the axis of rotation of the frame accurately synchronized with the rotational movement of the frame.

In use a spool of wire (not shown) is mounted on the carriage 58, and the wire is passed over grooved guide wheels 59 mounted on arms on the carirage. Four sub-frames of the kind shown in FIGURE 4 are mounted on the frame, and the end of the wire is attached to one of the supports 47 of one of the sub-frames. The machine is then put in motion, and the frame rotates in the direction indicated by the arrow A in FIGURE 1. Wire is drawn from the spool and forms a plurality of closely spaced turns as indicated by the dotted lines 60 in FIGURE 1. The corner bars 37 and supports 47 are so positioned that in use when a turn of wire is wound onto the frame it extends round each corner bar and touches the flat surfaces of the two supports adjacent to it, and extends unsupported between each support and the adjacent support close to the next corner bar.

A wire feed device may be provided to control the wire as it unwinds from a spool. The rotation of the frame draws the wire through the wire feed from the spool. The wire feed is so designed as to reduce the possibility of wire breakage as far as possible. When relatively thick wire is used it may be possible to employ a wire feed similar to that in a sewing-machine and in which resistance is afforded by a pair of spring-loaded plates or pads urged towards each other, the wire passing between them. When relatively thin wire is used, however, for example tungsten wire 0.0005 inch thick, it is preferred to use a wire feed of the kind including the features which are described in British Patents Numbers 572,003, 591,892 and 720,977. Whatever form of wire feed is used the arrangement is preferably such that the changes in rate of wire feed are kept as low as possible. It will be appreciated that when a frame of the kind illustrated is rotated at a uniform speed the rate of wire feed changes somewhat, though the variation is less than it would be with a frame having two guides only. If the tension of the wire varies as the wire is being wound onto the frame there may be a tendency for some turns to sag. With a view to overcoming this tendency the corner bars 37 and the supports 47 are preferably made smooth so as to enable any loose turns to be pulled tight as soon as the tension increases again. This may be unnecessary, however, if the wire tension can be maintained sufficiently even.

When the wire has been wound onto the frame it is secured to the supports 47. The wire is preferably secured with the aid of an adhesive but mechanical clamps may be used if desired. A clamp may, for example, comprise two parallel bars faced with resilient material. In the preferred method a length of flexible, adhesive tape is laid over the turns of wire on each support so that the wire and those parts of the support between successive turns of the wire adhere to the tape. When this has been done the wire is severed, as with a razor blade, between each corner bar 37 and one of the adjacent supports 47. It is found that the loose ends of wire extending from the other adjacent support curl up against the support and need not be cut off. After severing the wire the clamps are released and the sub-frames removed from the frame. Even if there are no side members interconnecting the supports and forming with them a rigid sub-frame the array of wires can quite readily be handled without damage; one support can be carried horizontally and the other, hanging below, then holds the wires taut. Alternatively the supports can be held parallel with each other one in each hand, a moderate tension being applied in order to prevent the wires becoming slack and tangling with one another. When the wire is wound onto the frame in such a manner that there is no significant slack in any turns which must be taken up after the wire is laid, the supports 47 and/or the corner bars 37 may be such as to cause the wire to adhere to them. In a convenient arrangement a length of flexible tape with both surfaces adhesive is caused to adhere to a support or corner bar, as the case may be, before the wire is wound onto the frame. A new length of tape would normally be used each time wire is wound onto the frame. Any wire thus caused to adhere to a corner bar would be severed between the corner bar and both of the adjacent supports, the wasted ends formed in this way being removed when the adhesive tape is stripped from the corner bar.

In order to avoid any disturbance of the wire as it is being wound onto the frame the whole winding machine is preferably enclosed in a draught-proof cabinet, which is conveniently provided with glass walls so that the winding operation can be readily observed. The doors of the cabinet are closed in use. The operation of the machine may be controlled by any suitable switching arangement, and means may be provided to enable the machine to switch itself off when arrays of a predetermined length have been formed. In order to avoid a jerk when the rotation starts, such as might break the wire, the drive to the pulley 55 is by way of a magnetic clutch 61; and a choke is introduced into the circuit of the driving motor for a predetermined time in order to cause the frame to accelerate only gradually. Movement of the frame is also controlled by a magnetic brake 62 which is gradually released as rotation starts.

The completed array of wires, extending between two supports, may be laid directly onto a sheet of glass which will form one side of a laminated panel. The array may then be secured in position by being sprayed with a material which sets to form a thin transparent skin over the glass and the wires. This material may be a solution in a volatile solvent of the same material as is used for the interlayer of the panel. For example, the material may be a solution of polyvinyl-butyraldehyde in chloroform. When the array is secured in position the wires may be cut, as with a razor blade, at the edges of the glass, whereupon the supports can be removed, stripped of the ends of wires and replaced on the frame.

The completion of the laminated panel forms no part of the present invention and may be effected in known ways. Bus-bars or feed conductors would normally be provided to join the wires in parallel with one another, and these may be of any suitable form. In a convenient construction the laminated panel may incorporate feed conductors of the kind described in our British Patent Number 972,453.

When a panel in accordance with the invention, and made by the method described above, is in use it is found that on occasion light is reflected simultaneously from a group of neighbouring wires so as to give the appearance of a shiny band in the panel. Further, the array may act as a diffraction grating and give rise to the appearance of chromatic fringes. With a view to overcoming this difficulty the wire is preferably crimped before it is incorporated in the panel. The crimping may be of any form provided that it renders the wire no longer straight. The wire may be crimped before it is wound onto the frame or after it has been removed from the frame.

A machine for crimping the array of wires after the supports have been removed from the frame is illustrated in FIGURES 7 to 11. The machine is housed in a glass-panelled cabinet 65 the doors of which are closed in use. The machine includes a guide, shown separately in FIGURE 8, mounted at an angle of about 20° to the vertical. The guide comprises a framework 66, made from angle-section members, and has mounted on its front, upwardly-facing side a plurality of rollers 67 freely rotatable about axes normal to the main plane of the framework 66. A carrier having parallel side members 68 and transverse members 69 is mounted on the front face of the framework, the side members running between pairs of rollers 67. The carrier is connected to a chain 70 which extends over a sprocket wheel 71 at the top of the cabinet and is connected to a counter-weight (not shown). Racks 72 are secured to the underside of the side members 68 and engage pinions 73 fixed on a shaft 74 mounted in bearings 75 on the framework 66. The shaft 74 also carries a pulley 76 which is connected by a belt to an electric motor 77. A ribbed roller 78 is mounted between bearings 79 on the framework 66, a short way below, and rather in front of the shaft 74. The roller has an extension at one end carrying a pulley 80 also driven by a band from the motor 77. A similar roller 81 is mounted in bearings 82 on arms 83 forming part of a swinging frame pivoted to the framework 66 at 84. As shown in FIGURE 10 the ribbed rollers 78 and 81 can mesh with each other, so that when roller 78 is driven the roller 81 also rotates. An adjustable stop 85 prevents the two rollers meshing with each other too tightly and maintains them sufficiently far apart to enable an array of wires to extend between them without being crushed. The swinging frame can be moved to the position shown in FIGURE 7 by means of a pneumatic piston-and-cylinder unit 86 pivotally connected to cabinet 65 and to the swinging frame.

In use the array of wires with its supports is mounted on the carrier, the rollers 78 and 81 are brought together, the motor 77 is started, and the carrier moves upwards, carrying the array with it, whilst the rollers rotate. The meshing ribs on the rollers crimp the wires, and to avoid any undue strain the rate of movement of the carrier is equal to the peripheral speed of the rollers. The movement of the parts of the machine are conveniently controlled by micro-switches, such as the switches 87 shown in FIGURES 9 and 10.

The machine is preferably automatic so that once started the front roller 81 is brought into engagement with the rear roller 78, the rear roller is driven and the carrier raised, the front roller 81 is swung forwards and upwards, and the carrier is lowered to its original position.

The shape of the ribs on the rollers is illustrated in FIGURE 11, and it is found that in spite of the angular shape of the ribs the wire forms undulations similar to those of the sine curve. During crimping, the effective length of the wires is reduced, so it is necessary to mount the supports on the holder in such a manner that they are free to move towards each other somewhat. The upper support, indicated by dotted lines 64 in FIGURE 9 and shown in full in FIGURE 10, is mounted on pins 88 which engage the slots in the ends of the support, and is located against endwise movement by studs 89. The lower support rests on a transverse member 90 at the lower end of the holder. If the supports are interconnected by side members 51 the wing nuts 50 at their lower ends are slackened so as to allow the associated bolts 49 to slide up the slots 52. The arrangement is such that when an array of wires has been crimped and the front roller 81 has been swung forwards and upwards the wires lift themselves away from the rear roller 78 sufficiently far to enable the array to be lowered without the crimped wires fouling the roller 78.

Typical arrays in accordance with the present invention, made from tungsten wire 0.0005 inch in diameter, may be up to 20 inches wide, with wires from 10 inches to 30 inches long at spacings of between 8 and 14 to the inch. If the wires are crimped the pitch (i.e. the distance from crest to crest) may be about 0.08 inch and the amplitude about 0.008 inch. These figures are given as examples only and are not to be considered as limitative.

After the array of wires has been crimped it is removed, with the supports, from the crimping machine. It is then incorporated in a wired panel in any suitable manner, such as that described in our British Patent Number 972,453 mentioned above. Unless special precautions are taken, however, the plane of the undulations in each wire will initially be roughly at right angles to the plane of the surface of the glass, and the undulations may be pressed out of the wires, at least to some extent, when the interlayer is applied to the sheet. To avoid this difficulty crimped end portions of the wires are preferably pressed against the sheet so that the wires rotate through about 90° and the undulations lie in the main plane of the array. In a convenient method, illustrated diagrammatically in FIGURE 12 the supports 47 are placed on stands 91 on either side of a glass sheet 92, the arrangement being such that the wires lie immediately above and in contact with the surface of the glass. Without the stands 91 the supports may tend to pull the wires and partially uncrimp them. Weights 93 are laid on the crimped wires towards but not immediately adjacent to, opposite edges of the glass, so as to press the wires against the sheet and cause them to rotate as described above. The array of wires may then be secured in posiiton by spraying it, on either side of the weights 93, with a material which sets to form a thin transparent skin over the glass and wires. The weights 93 are then removed and those parts of the wires thus uncovered are secured by further spraying. When the array has been secured in position on the glass the surplus wire is cut off along the edges of the glass and removed before the panel is completed.

It is found that some wires rotate one way and some the other when the weights are applied. This increases the randomness of the pattern made by the wires in the completed panel and helps to reduce still further any tendency there may be for diffraction patterns to be formed when the panel is in use.

The completed wired panel is illustrated in FIGURES 13 to 15. The panel comprises two sheets of glass 92 and 94 with the array of wires 95 secured against the sheet 92 as described above, and a sheet of interlayer material 96 between the array 95 and the sheet 94. Bus-bars or feed conductors 97 join the adjacent ends of the wires in the array, and the arrangement may be such that those parts of the wires beneath the bus-bars are not crimped.

What we claim is:

1. Apparatus for forming arrays of heating wires for incorporation in a laminated transparent panel the apparatus comprising a stand, a frame rotatably mounted on the stand and a wire feed device movable in a direction parallel with the axis of rotation of the frame, the frame carrying at least two corner bars mounted parallel with and equidistant from the axis of rotation of the frame, the apparatus further including support members of elongated shape and means to releasably mount said support members on each corner bar and parallel therewith, the bars and the support members being so positioned that in operation of the apparatus the wire is wound onto those bars and the support members, the corner bars being adjustable in unison so as to vary their distance from the axis of rotation of the frame wherein the frame includes a plurality of radially extending screw threaded rods so as to be rotatable about their own axis, but restrained against axial movement, the rods being in threaded engagement with nut formations on said corner bars and driven by gear means from a common shaft coaxial with the axis of rotation of the frame.

2. Apparatus as claimed in claim 1 wherein said gear means comprises a plurality of first bevel gears one carried by each of the rods at its inner end, said first bevel gears meshing with second bevel gear means mounted on said shaft and adapted to rotate said first bevel gears when the shaft is rotated relatively to the frame.

3. Apparatus as claimed in claim 2 wherein said shaft is rotatable by a hand wheel adapted to be releasably connected to one end of the shaft.

4. Apparatus as claimed in claim 1 wherein each corner bar is coupled to two of said screw-threaded rods, one rod being at each end of the corner bar.

5. Apparatus as claimed in claim 2 wherein the second bevel gear means comprises two bevel gears on the shaft.

6. Apparatus as claimed in claim 1 wherein the means to releasably mount the support members comprises releasable clamping means which are fixed to each corner bar, said clamping means being adapted to locate said support members.

7. Apparatus as claimed in claim 6 wherein the support members form part of a removable sub-frame for supporting the array of wires.

8. Apparatus as claimed in claim 1 wherein the frame is caused to rotate by an electric motor through the intermediary of a magnetic clutch.

9. Apparatus as claimed in claim 8 wherein electrical choke means are incorporated in the circuit of the motor in order to cause the frame to accelerate gradually on starting.

10. Apparatus as claimed in claim 8 wherein there is a magnetic brake operative to control the movement of the frame.

11. Apparatus as claimed in claim 8 wherein the motor drives the frame through speed-change gearing.

References Cited

UNITED STATES PATENTS

| | | | |
|---|---|---|---|
| 1,885,613 | 11/1932 | Littell | 242—110.1 |
| 2,068,675 | 1/1937 | Heller | 140—92.2 |
| 2,333,301 | 11/1943 | Dorn et al. | 242—110.1 |
| 2,942,168 | 6/1960 | Schrack | 318—419 |
| 3,036,679 | 5/1962 | Millington | 192—84 |
| 3,053,364 | 9/1962 | Thielmann | 192—84 |
| 3,096,470 | 7/1963 | Kalenian | 318—511 |
| 3,143,306 | 8/1964 | Dijkmans et al. | 140—92.2 |
| 3,171,610 | 3/1965 | Hoch | 242—110.1 |
| 3,185,185 | | Pfund | 140—105 |

JOHN F. CAMPBELL, Primary Examiner

R. B. LAZARUS, Assistant Examiner

U.S. Cl. X.R.

140—92.2; 242—7.15, 127